Aug. 14, 1923.

J. WITTE 1,464,859

GEAR SHIFT LOCK

Filed Sept. 15, 1922

Inventor:
JOHN WITTE.
By F. R. Cornwall,
Atty.

Patented Aug. 14, 1923.

1,464,859

UNITED STATES PATENT OFFICE.

JOHN WITTE, OF FERGUSON, MISSOURI.

GEAR-SHIFT LOCK.

Application filed September 15, 1922. Serial No. 588,505.

*To all whom it may concern:*

Be it known that I, JOHN WITTE, a citizen of the United States, residing at Ferguson, county of St. Louis, and State of Missouri, have invented a certain new and useful Improvement in Gear-Shift Locks, of which the following is a full, clear, and exact description, such as will enable others skilled in the art to which it appertains to make and use the same, reference being had to the accompanying drawings, forming part of this application.

My invention relates to gear shift lever locks such as are used on automobiles, and consists in improvements on the structure shown in my copending application, Serial No. 542,273, filed March 9, 1922.

In the structure of the above mentioned application the gear shift lever is locked by moving it axially in its mounting. Objections have been raised to this method of operating the locking device, and the object of my present invention is to eliminate such axial movement of the lever.

In the accompanying drawings, which illustrate selected embodiments of my invention,—

Figure 1:
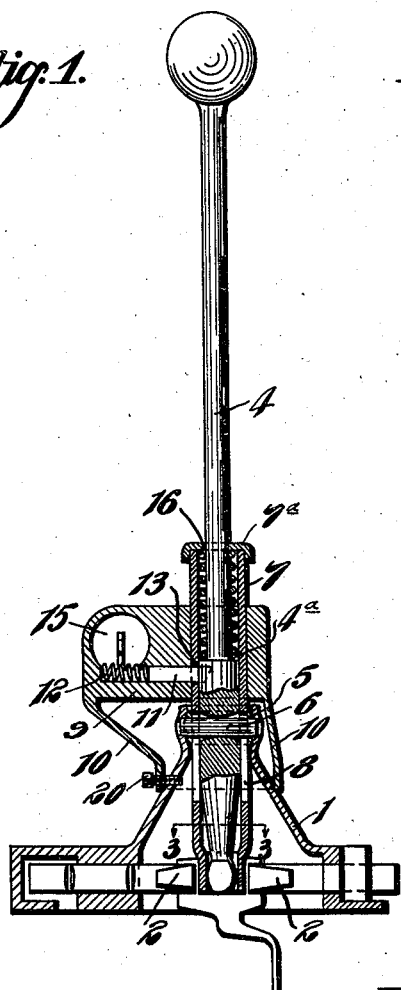
Figure 1 is a vertical section through a gear shift housing and lever to which my invention is applied and showing the parts in locking position.

The shift lever housing 1 and the gear shifting elements 2 mounted upon shaft rods 3 are of any ordinary type and form no part of my invention.

The shift lever 4 is provided with a universal joint mounting in housing 1 comprising a ring 5 having a spherical contour which adapts it to be socketed in the housing and provided with a vertical opening through which lever 4 extends and provided with a horizontal passage in which a lever supporting pin 6 is seated. The lower end of lever 4 is adapted to be selectively engaged with either one of the gear shift elements 2 to move the same and one of rods 3 in the desired direction.

Figure 3:
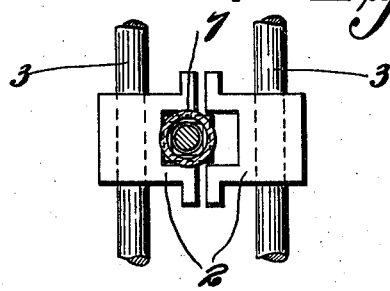
Figure 3 is a horizontal section taken on line 3—3 of Figures 1 and 2.

Slidably mounted upon lever 4 is a sleeve 7 having slots 8 which receive pin 6 and permit movement of sleeve 7 along lever 4. When sleeve 7 is in its lowermost position, as indicated in Figure 1, its lower end is between gear shift elements 2 and is adapted to engage both of these elements to prevent their relative movement, consequently locking the elements against movement from their neutral position, indicated in Figure 3.

Slidably mounted on the upper portion of sleeve 7 is a casing 9 having a depending skirt 10 fitting over the upper portion of housing 1 and preferably made of tool steel material to prevent tampering therewith. A locking bolt 11 in casing 9 is thrust inwardly by a coiled spring 12 through a hole 13 in sleeve 7 and engages a notch 14 in the lever when aligned therewith and can only be retracted from the notch by rotation of a key operated lock 15. An optional set screw 20 retains casing 9 in its lowest position.

Obviously, when casing 9 and sleeve 7 are in the position shown in Figure 1, it will be impossible to raise the sleeve and release the gear shift elements from their neutral position except by operating lock 15, which can only be done by the use of a proper key.

A coiled spring 16 seated at its lower end on a shoulder $4^a$ on the lever and having its upper end seated against the under surface of a cap $7^a$ on sleeve 7 tends to thrust the locking sleeve upwardly when the latter is not retained in its lowest position by bolt 11.

Figure 2:
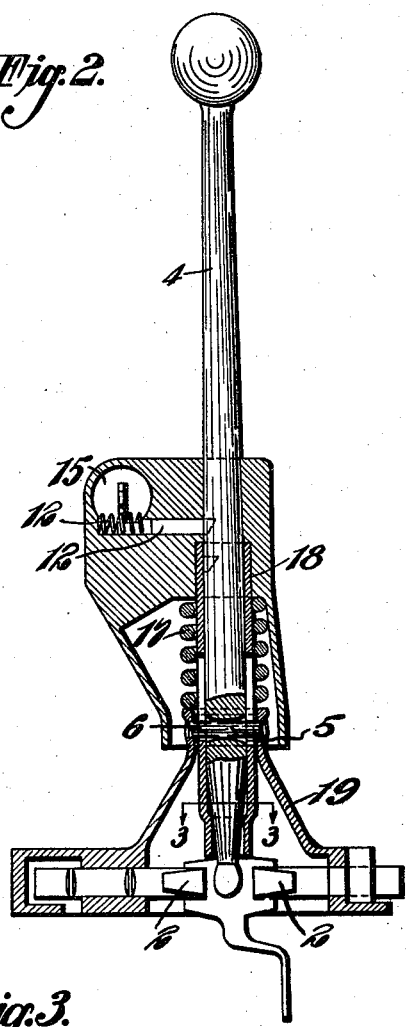
Figure 2 is a similar section through a modified form of my invention and showing the parts in unlocked position.

The construction shown in Figure 2 resembles that shown in Figure 1 in all essentials, the only substantial differences being that spring 17 is coiled about the exterior of sleeve 18 and is seated upon housing 19 instead of a shoulder on the gear shift lever, the casing is pressed onto the upper end of the sleeve and moves with the latter.

In both of these constructions, the shaft lever may be locked in neutral position by downward pressure upon the sleeve or casing, respectively, which pressure may be applied either by the hand or foot of the driver of the car and without the use of the lock key. To release the lever from locked position, it is only necessary to turn the lock so as to retract bolt 11 from the lever notch. With these constructions, it is apparent that accidental pressure or pull upon the gear shift lever could not serve to lock the same as is possible with my former construction and others now on the market.

Various modifications in the details of construction of my invention may be made without departing from the spirit thereof as expressed in the appended claims.

What I claim is:

1. In a gear shift lock, a shift lever including a handle portion, and a member slidably mounted upon said lever at a point spaced from its handle portion and adapted to engage a plurality of gear shift elements to prevent their relative movement.

2. In a gear shift lock, a shift lever having a fixed axial position and including a handle, a member slidably mounted upon said lever below its handle and adapted to engage a plurality of gear shift elements to prevent their relative movement, and key controlled means for securing said member in element engaging position.

3. In a gear shift lock, a shift lever having a handle at its upper end, a member slidably mounted upon the lower portion of said lever and adapted to engage a plurality of gear shift elements to prevent their relative movement, a locking bolt for said member, a key controlled lock operatively connected to said bolt, and means for engaging said lever by said bolt to prevent sliding movement of said member on said lever.

4. A gear shift lock comprising a one piece gear shift lever adapted to selectively engage gear shift rod elements at one end and provided with an integral operating handle at its other end, and a sleeve slidable longitudinally of said lever between the ends of the latter and adapted to engage a plurality of shift rod elements simultaneously when at one extreme of its movement on said lever.

5. In combination, a gear shift housing, a shift lever having a universal joint mounting in said housing but maintained at a predetermined height therein and having an integral operating handle at its upper end, gear shifting elements adapted to be selectively engaged by said lever, a sleeve slidable on said lever below its handle, a spring compressed between said housing and a downwardly facing shoulder on said sleeve, and key controlled means for holding said sleeve in its lowermost position, said sleeve in said position engaging a plurality of gear shifting elements.

6. In combination, a casing, gear shift rods mounted thereon, lugs on said rods, a gear shift lever pivotally and non-slidably mounted on said casing and provided with a handle portion, and a member slidable on said lever to a lug engaging position in which it locks said lugs against movement.

In testimony whereof I hereunto affix my signature this 13th day of September, 1922.

JOHN WITTE.